United States Patent [19]
Kubota et al.

[11] 3,929,571
[45] Dec. 30, 1975

[54] PROCESS FOR PREPARING L-LYSINE

[75] Inventors: Koji Kubota; Yasuhiko Yoshihara, both of Kawasaki; Yoshio Hirose, Fujisawa, all of Japan

[73] Assignee: Ajinomoto Co., Inc., Tokyo, Japan

[22] Filed: May 20, 1974

[21] Appl. No.: 471,190

[30] Foreign Application Priority Data
May 24, 1973  Japan.............................. 48-58361
June 2, 1973  Japan.............................. 48-62258

[52] U.S. Cl..................... 195/29; 195/28 R; 195/30
[51] Int. Cl.².......................................... C12D 13/06
[58] Field of Search ............ 195/29, 28, 30, 47, 114

[56] References Cited
UNITED STATES PATENTS
3,707,441  12/1972  Shiio et al............................. 195/29

*Primary Examiner*—A. Louis Monacell
*Assistant Examiner*—Robert J. Warden
*Attorney, Agent, or Firm*—Hans Berman; Kurt Kelman

[57] ABSTRACT

Better yields of L-lysine can be obtained by culturing an L-lysine producing microorganism in a nutrient medium supplememted with an antibiotic, a surface active agent and/or an anti-oxidant.

7 Claims, No Drawings

PROCESS FOR PREPARING L-LYSINE

This invention relates to a process for preparing L-lysine, and particularly to the fermentative preparation of L-lysine.

It is an object of the present invention to improve the yield of L-lysine from a carbon source in a fermentation medium.

L-Lysine may be formed from fermentable carbohydrates by microorganisms as is well known. Known L-lysine-producing microorganisms include a homoserine- or methionine- and threonine-requiring mutant of *Micrococcus glutamicus* disclosed in U.S. Pat. No. 2,979,439; the threonine- or methionine-sensitive mutants and threonine-sensitive and threonine-requiring mutants of *Brevibacterium flavum* disclosed in U.S. Pat. No. 3,616,218; mutants of *Brevibacterium flavum*, *Corynebacterium acetoglutamicum*, *Microbacterium ammoniaphilum*, or *Micrococcus glutamicus* resistant to the lysine analogue S-(2-amino-ethyl)-L-cysteine (AEC) as disclosed in U.S. Pat. No. 3,707,441, and a mutant of Arthrobacter combining resistance to AEC with one or more nutrient requirements which is disclosed in Belgian Pat. No. 798,890.

We now have found that the metabolism of mutant strains normally employed for producing L-lysine can be influenced by antibiotics, surface active agents and/or anti-oxidants in the culture media, and that L-lysine can be produced in high yields and high concentrations in such modified culture media.

The microorganims employed in the present method may be of any L-lysine producing strain such as those mentioned above, and may be derived by means of conventional mutagenic agents from parent strains of the genera Brevibacterium, Corynebacterium, Microbacterium, and Arthrobacter, and by screening of the mutants so produced for the necessary resistance to AEC, and/or a nutrient requirement.

The addition agents suitable for the present method include the following substances:
1. Antibiotics; chloramphenicol, erythromycin, oleandomycin, kanamycin, streptomycin, kasugamycin, tetracycline, oxytetracycline, mytomycin C, actinomycin D, cycloserine, members of the penicillin and cephalosporin groups, polymyxin and azaserine.
   Chloramphenicol, erythromycin, oleandomycin, streptomycin and kasugamycin which are thought to react with the protein synthesizing part of the microorganism were found to be especially effective.
2. Surface active agents; anionic surface active agents such as higher alcohol sulfates, alkylbenzenesulfonates, alkyl phosphates and dialkyl sulfosuccinates, cationic surface active agents such as alkylamine salts and quaternary ammonium salts, nonionic surface active agents such as polyoxyethylene alkyl ether, polyoxyethylene sorbitan monoalkyl ether and sorbitan monolaurate, amphoteric surface active agents such as imidazoline and betaine.
3. Antioxidants; 4,4'-dihydroxy-3,3'-dimethyldiphenyl, 2,6-di-3-butylphenol, catechol, butylcatechol, protocatechuic acid, α-tocopherol, pyrogallol, gallic acid, esters of gallic acid, naphthol, phenolic compounds such as aminophenol, amines such as naphthylamine, diphenylamine, di-2-butyl-p-phenylenediamine, 6-ethoxy-2,3,4-trimethyl-1,2-dihydroquinoline, semicarbazide, phenothiazine and tetraphenylhydrazine, and sulfur containing compounds such as thio-dipropionic acid and thio-diglycolic acid.

We have found that the amount of L-lysine accumulated in a culture broth by an otherwise known process is generally increased by the presence of antibiotics, surface active agents and/or antioxidants in the medium. However, we cannot explain why the L-lysine accumulation was increased by the addition. We assume that antibiotics or surface active agents affect the permeability of the cell wall or cell membrane of the L-lysine-producing microorganism so that L-lysine synthesized by the organism may be released to the fermentation medium, and that addition of antioxidants prevents enzymes necessary for the biosynthesis of L-lysine from being inactivated by oxidation.

The additives are added to the culture medium in an amount to inhibit the growth of the microorganism to some extent. They may be added in one batch at the beginning of the cultivation or during the cultivation, or added intermittently during the cultivation.

The fermentation medium employed may be a natural nutrient medium or a synthetic nutrient medium providing the basic needs of the microorganisms used.

Suitable carbon sources include carbohydrates, such as glucose, fructose, maltose, sucrose, starch, starch hydrolyzate, molasses, also organic acids, particularly acetic acid, propionic acid, benzoic acid, or fumaric acid, and alcohols, particularly methanol, propanol and ethanol, and a medium may contain several different carbon sources. Some of the mutants assimilate hydrocarbons as a major or minor carbon source.

Nitrogen may be supplied by ammonium salts, nitrates, urea, amino acids, cornsteep liquor, yeast extract, meat extract, fish meal, peptone, bouillon, casein hydrolyzates, and mixtures thereof, and also by ammonia.

Necessary inorganic ions may be provided by magnesium sulfate, sodium phosphate, potassium mono- and dihydrogen phosphate, iron sulfate, manganese chloride, calcium chloride, sodium chloride and others.

The specific nutrients required by the mutants employed may be provided in the form of natural products containing the same, and simple derivatives of natural products, such as soybean protein hydrolyzate, yeast extract, cornsteep liquor, peptone, casein hydrolyzate, and the like.

It is important that the pH of the fermentation medium be controlled for optimum production of L-lysine. We prefer to maintain the pH between 5.0 and 9.0. This is conveniently accomplished by addition of urea, ammonia, calcium carbonate, organic or inorganic acids as may be necessary during the fermentation. We carry out the fermentation at temperatures of about 24°–37°C, but the optimum temperature will vary depending upon the microorganism employed. The fermentation is conducted under aerobic conditions for about 2 – 7 days.

The L-lysine thus produced may be recovered from the broth by methods known in the art. These include absorption on and elution from suitable ion-exchange resins, removal of the cells and concentration of the filtrate containing L-lysine, and the like.

The L-lysine accumulated in the fermentation broth was identified by its ninhydrin reaction on a paper chromatogram, the Rf value on the paper chromatogram, electrophoresis, response to microbioassay, and response to lysine decarboxylase, as well as by comparison with authentic samples.

The amount of lysine produced in the culture broth was determined by a colorimetric method based on an acidic-copper ninhydrin reaction, and is shown as the hydrochloride.

The following Examples are illustrative of the present invention.

EXAMPLE 1

A basic culture medium containing 10% glucose, 4.5% ammonium sulfate, 0.1% $KH_2PO_4$, 0.04% $MgSO_4.7H_2O$, 2 ppm $Fe^{++}$, 2 ppm $Mn^{++}$, 50 µg/l biotin, 200 µg/l thiamine hydrochloride, 1% soybean protein hydrolyzate (total nitrogen 7%), and 5% calcium carbonate (sterilized separately), of pH 8.0, was divided into 20 ml batches. Each batch was further mixed with chloramphenicol or Miranol 2MCA (Brand name of cationic surface active agent produced by Miranol Chemical Co., Inc.), as indicated below, placed in a 500 ml shaking flask, and sterilized. The batches were inoculated with *Brevibacterium lactofermentum* FERM P-1944 (AEC resistant strain induced from *Brevibacterium lactofermentum* ATCC 13869) or *Corynebacterium glutamicum* FERM P-1987 (AEC resistant strain induced from *Micrococcus glutamicus* ATCC 13032) which had previously been cultured on bouillon-glucose slants, and cultivation was carried out at 31°C with shaking. The batches were divided into two groups.

To one group, chloramphenicol was added initially and/or 15 hours after inoculation in an amount shown in the following Table 1. The fermentation was permitted to proceed for a total of 72 hours. The amount of L-lysine, as hydrochloride, accumulated in the broths was as shown in Table 1.

From the fermented broth of each of the two strains which were cultured in media without antibiotics, more than 3000 colonies were examined for their ability of producing L-lysine. All showed resistance to AEC and were able to produce L-lysine. This shows that there was no back mutation even after the 72 hours' cultivation.

To another group of batches, Miranol 2MCA was added initially or 7 hours after inoculation in an amount shown in Table 2.

After a total of 72 hours' cultivation, L-lysine accumulated in each broth as shown in Table 2.

EXAMPLE 2

L-lysine fermentation was carried out in the manner described in Example 1, but 0.5 µg/ml erythromycin was added initially and 3 µg/ml 15 hours after inoculation instead of chloramphenicol.

After 72 hours' cultivation, L-lysine accumulated in the broth and in control cultures without erythromycin as shown in Table 3.

EXAMPLE 3

L-lysine fermentation was carried out in the manner described in Example 1, but Miranol 2MCA was replaced by Tween-20 (polyoxyalkylene derivatives of sorbitan monolaurate, produced by Atlas Powder Co., Inc.) in an amount shown in Table 4.

After 72 hours' cultivation, L-lysine accumulated in the broth as shown in Table 4.

EXAMPLE 4

L-lysine fermentation was carried out in the manner described in Example 1, but the microorganisms employed were *Brevibacterium lactofermentum* FERM P-1711 (AEC resistant and requiring alanine), *Corynebacterium glutamicum* FERM P-1613 (AEC resistant and requiring serine), *Corynebacterium glutamicum* FERM P-1982 (AEC resistant and requiring proline), *Brevibacterium lactofermentum* FERM P-1857 (AEC resistant and requiring alanine and leucine), *Brevibacterium lactofermentum* FERM P-1574 (AEC resistant and requiring nicotinic acid or nicotinamide) and *Brevibacterium lactofermentum* FERM P-1575 (AEC resistant and requiring hypoxanthine), and the antibiotics used are listed in Table 5.

After 72 hours' cultivation, L-lysine accumulated in the broth as shown in Table 5.

EXAMPLE 5

L-lysine fermentation was carried out in the manner described in Example 1, but employing *Corynebacterium glutamicum* FERM P-1613, *Corynebacterium glutamicum* FERM P-1982, *Micrococcus glutamicus* ATCC 13286 (requiring homoserine), *Brevibacterium lactofermentum* FERM P-1572 (AEC resistant and requiring serine and leucine), *Brevibacterium lactofermentum* FERM P-1574, *Brevibacterium lactofermentum* FERM P-1575, and *Brevibacterium lactofermentum* FERM P-1841 (requiring threonine), but adding required nutrients as shown in Table 6 and surface active agents shown in the same Table after 16 hours' cultivation.

After 72 hours' cultivation, L-lysine accumulated in the broth as shown in Table 6.

EXAMPLE 6

L-lysine fermentation was carried out in the manner described in Example 1, but employing *Brevibacterium lactofermentum* FERM P-1944, FERM P-1711, FERM P-1572, FERM P-1574, FERM P-1575, FERM P-1841, *Corynebacterium glutamicum* FERM P-1987, FERM P-1613, FERM P-1982, and *Micrococcus glutamicus* ATCC 13286, adding required nutrients as shown in Table 7 and the antioxidants shown in the Table.

After 72 hours' cultivation, L-lysine accumulated in the broth as shown in Table 7.

EXAMPLE 7

A basic culture medium containing 10% beet molasses (as glucose), 4.5% ammonium sulfate, 0.1% $KH_2PO_4$, 0.04% $MgSO_4.7H_2O$, 2 ppm $FE^{++}$, 2 ppm $Mn^{++}$, 50 µg/l biotin, 200 µg/l thiamine hydrochloride, 1.5% soybean protein hydrolyzate (total nitrogen 7%), and 5% calcium carbonate (sterilized separately), of pH 8.0, was divided into 20 ml batches. The batches were placed in 500 ml shaking flasks, sterilized, inoculated with Brevibacterium lactofermentum FERM P-1711 which had previously been cultured on bouillon-glucose slants, and cultivated at 31°C for 72 hours with shaking after the addition of chloramphenicol, erythromycin, Miranol 2MCA and/or Tween 20 as listed in Table 8. L-lysine accumulated in the broth as shown in Table 8.

EXAMPLE 8

*Brevibacterium lactofermentum* FERM P-1711 was cultured in the manner described in Example 7 but employing a medium containing 15% beet molasses (as glucose) and adding 0.1% Miranol 2MCA 26 hours after inoculation. After 90 hours, 5.8 g/dl of L-lysine were found in the broth. Only 5.2 g/dl of L-lysine were found in a broth cultured in the same way but without Miranol 2MCA.

EXAMPLE 9

Corynebacterium glutamicum FERM P-1982 was cultured in the manner described in Example 7 but using cane molasses instead of beet molasses and adding tetracycline, Nissannonion LT221 or gallic acid to the medium in the manner shown in Table 9.

After 72 hours' cultivation, the amount of L-lysine accumulated in the broth was as shown in Table 9.

Table 1

| Strain | Chloramphenicol (μg/ml) | | Growth (OD) | Residual glucose (g/dl) | L-lysine (g/dl) | Yield (%) |
|---|---|---|---|---|---|---|
| | 0 hr | 15 hrs | | | | |
| FERM P-1944 | 1 | 0 | 1.18 | 0 | 2.0 | 20 |
| | 2 | 0 | 1.18 | 0.5 | 2.0 | 21 |
| | 1 | 5 | 0.91 | 0.2 | 3.1 | 32 |
| | 1 | 50 | 0.76 | 3.5 | 2.0 | 31 |
| | 0 | 0 | 1.25 | 0 | 1.8 | 18 |
| FERM P-1987 | 1 | 5 | 0.95 | 0.5 | 3.0 | 30 |
| | 0 | 0 | 1.25 | 0 | 1.8 | 18 |

(Note)
Growth: Specific optical density (OD) was determined at 562 mμ in a sample diluted to 26 times its initial volume.
Yield: Based on consumed glucose.

Table 2

| Strain | Miranol 2MCA (%) | | L-lysine (g/dl) |
|---|---|---|---|
| | 0 hr | 7 hrs | |
| FERM P-1944 | 0.01 | 0 | 2.0 |
| | 0.05 | 0 | 2.3 |
| | 0 | 0.05 | 2.3 |
| | 0 | 0.1 | 2.4 |
| | 0 | 0 | 1.8 |
| FERM P-1987 | 0.05 | 0 | 2.1 |
| | 0 | 0.1 | 2.5 |
| | 0 | 0 | 1.8 |

Table 3

| Strain | Erythromycin | Growth (OD) | L-lysine (g/dl) |
|---|---|---|---|
| FERM P-1944 | added | 0.94 | 3.3 |
| | not added | 1.25 | 1.8 |
| FERM P-1987 | added | 0.95 | 3.1 |
| | not added | 1.25 | 1.8 |

Table 4

| Strain | Tween 20 (%) | | L-lysine (g/dl) |
|---|---|---|---|
| | 0 hr | 7 hrs | |
| FERM P-1944 | 0.1 | 0 | 2.0 |
| | 0.2 | 0 | 2.3 |
| | 0 | 0.1 | 2.2 |
| | 0 | 0.2 | 2.5 |
| | 0 | 0 | 1.8 |
| FERM P-1987 | 0.2 | 0 | 2.4 |
| | 0 | 0.2 | 2.5 |
| | 0 | 0 | 1.8 |

Table 5

| Strain | Antibiotic | Growth (OD) | L-lysine (g/dl) |
|---|---|---|---|
| FERM P-1711 | Dihydroxystreptomycin Initially: 0.5μg/ml After 24 hrs: 4μg/ml | 0.97 | 4.7 |
| | None | 1.05 | 4.2 |
| FERM P-1613 | Tetracycline Initially: 1μg/ml After 24 hrs: 7μg/ml | 1.00 | 2.8 |
| | None | 1.11 | 2.5 |
| FERM P-1982 | Penicillin G Initially 1 U/ml After 20 hrs: 5 U/ml | 0.93 | 3.3 |
| | None | 1.02 | 3.0 |
| FERM P-1857 | Chloramphenicol Initially: 1.5μg/ml After 24 hrs: 5μg/ml | 0.75 | 5.8 |
| | None | 0.88 | 5.1 |
| FERM P-1574 | Azaserine Initially: 5μg/ml After 24 hrs: 20μg/ml | 0.98 | 3.4 |
| | None | 1.08 | 3.0 |
| FERM P-1575 | Polymixin B Initially: 1 U/ml After 20 Hrs: 4 U/ml | 0.93 | 3.5 |
| | None | 1.10 | 3.0 |

Table 6

| Strain | Nutrient | Surface active agent (%) | L-lysine (g/dl) |
|---|---|---|---|
| FERM P-1613 | — | Rypon LE 110: 0.05% | 3.5 |
| | | None | 3.0 |
| FERM P-1982 | — | Ryponol LL 103: 0.1% | 3.3 |
| | | None | 3.0 |
| ATCC 13286 | DL-Methionine 15 mg/dl | Rypomin LH: 0.1% | 4.3 |
| | | None | 3.8 |
| FERM P-1572 | — | Ovanol 516: 0.05% | 5.1 |
| | | None | 4.6 |
| FERM P-1574 | — | Ryponox NCK: 0.1% | 3.6 |
| | | None | 3.1 |
| FERM P-1575 | Hypoxanthine 10 mg/dl | Nissannonion LT221: 0.2% | 3.8 |
| | | None | 3.0 |
| FERM P-1841 | DL-Methionine 150 mg/dl | Catinal HTB: 0.01% | 2.9 |
| | | None | 2.3 |

(Note)
Rypon LE 110: ethanolamine alkylbenzenesulfonate (The Lion Fat and Oil Co., Ltd.)
Ryponol LL 103: lauryl sulfate (The Lion Fat and Oil Co., Ltd.)
Rypomin LH: an amphoteric surface active agent of imidazoline type (The Lion Fat and Oil Co., Ltd.)
Ryponox NCK: polyoxyethylene-alkylphenolether (The Lion Fat and Oil Co., Ltd.)

Ovanol 516: an amphoteric surface active agent of betaine type (Toho Chemical Industrial Co., Ltd.)
Catinal HTB: benzalkonium chloride (Toho Chemical Industrial Co., Ltd.)
Nissannonion LT 221: nonionic surface active agent (Nippon Oils and Fats Co., Ltd.).

Table 7

| Strain | Nutrient | Antioxidant (mg/ml) | L-lysine (g/dl) |
|---|---|---|---|
| FERM P-1944 | — | Gallic acid Initially: 0.5 | 2.5 |
| | | None | 1.8 |
| FERM P-1711 | — | L-Aspartic acid & Laurylgallate After 12 hrs: 0.05 each | 4.6 |
| | | None | 4.2 |

Table 7-continued

| Strain | Nutrient | Antioxidant (mg/ml) | L-lysine (g/dl) |
|---|---|---|---|
| FERM P-1572 | — | Thio-diglycol After 12 hrs:0.05 | 5.0 |
| | | None | 4.6 |
| FERM P-1574 | — | α-Tocopherol After 12 hrs:0.1 | 3.7 |
| | | None | 3.1 |
| FERM P-1575 | Hypoxanthine 10 mg/dl | Butylhydroxyanisol After 12 hrs:0.05 | 3.4 |
| | | None | 3.0 |
| FERM P-1841 | DL-Methionine 150 mg/dl | Butylcatechol After 12 hrs:0.1 | 2.7 |
| | | None | 2.3 |
| FERM P-1987 | — | Protocatechuic acid Initially: 1 | 2.2 |
| | | None | 1.8 |
| FERM P-1613 | — | Butylhydroxytoluene After 12 hrs:0.05 | 3.3 |
| | | None | 3.0 |
| FERM P-1982 | — | BHA After 12 hrs:0.02 & Thio-diglycolic acid After 12 hrs: 0.1 | 3.8 |
| | | None | 3.0 |
| ATCC 13286 | DL-Methionine 15 mg/dl | Ethyl gallate After 12 hrs:0.1 | 4.4 |
| | | None | 3.8 |

Table 8

| Additive | | Time of addition | L-lysine (g/dl) |
|---|---|---|---|
| Chloramphenicol | 25 μg/ml | 17 hrs | 4.3 |
| Erythromycin | 15 μg/ml | 17 hrs | 4.1 |
| Miranol 2MCA | 0.1% | 18 hrs | 3.9 |
| Tween 20 | 0.2% | 18 hrs | 3.8 |
| Chloramphenicol plus Tween 20 | 25 μg/ml 0.2% | 17 hrs | 4.6 |
| None (control) | — | — | 3.5 |

Table 9

| Additive | | Time of addition | L-lysine (g/dl) |
|---|---|---|---|
| Tetracycline | 15 μg/ml | 19 hrs | 4.2 |
| Nissannonion LT221 | 0.2% | 19 hrs | 3.6 |
| Gallic acid | 0.5% | 19 hrs | 3.5 |
| None (control) | — | — | 3.1 |

What we claim is:

1. In a process of producing L-lysine by aerobically culturing an L-lysine producing microorganism at pH 5 to 9 on a medium containing assimilable sources of carbon and nitrogen, inorganic salts and minor organic nutrients required for the growth of said microorganism until L-lysine accumulates in said medium, and by recovering the accumulated L-lysine, said microorganism being a strain of Brevibacterium, Corynebacterium, Microbacterium, Micrococcus, or Arthrobacter, the improvement which comprises culturing said microorganism in said medium in the presence of an amount of an addition agent sufficient to improve the yield of said L-lysine as compared to the yield of said L-lysine produced in the absence of said agent, said agent being an antibiotic, a surface active agent, or an anti-oxidant.

2. In a process as set forth in claim 1, the amount of said agent being sufficient to inhibit the growth of said microorganism.

3. In a process as set forth in claim 1, said microorganism being resistant to S-(2-aminoethyl)-cysteine.

4. In a process as set forth in claim 1, said microorganism requiring at least one nutrient selected from the group consisting of homoserine, threonine, methionine, alanine, proline, serine, isoleucine, valine, leucine, arginine, histidine, nicotinamide, panthothenic acid, thiamine, guanine, hypoxanthine and vitamine $B_{12}$.

5. In a process as set forth in claim 1, said agent being selected from the group consisting of chloramphenicol, erythromycin, oleandomycin, kanamycin, streptomycin, kasugamycin, tetracycline, oxytetracycline, mytomycin C, actinomycin D, cycloserine, penicillin group compounds, cephalosporin group compounds, polymyxin and azaserine.

6. In a process as set forth in claim 1, said agent being a surface active agent selected from the group consisting of a sulfate of a higher alcohol, alkylbenzenesulfonate, alkyl phosphate, dialkyl sulfosuccinate, an alkylamine salt, a quaternary ammonium salt, polyoxyethylene alkyl ether, polyoxyethylene sorbitan monoalkylether, sorbitan monolaurate, imidazoline and betaine.

7. In a process as set forth in claim 1, said agent being an antioxidant selected from the group consisting of 4,4'-dihydroxy-3,3'-dimethyldiphenyl, 2,6-di-3-butylphenol, catechol, butylcatechol, protocatechuic acid, α-tocopherol, pyrogallol, gallic acid, an ester of gallic acid, naphthol, aminophenol, naphthylamine, diphenylamine, di-2-butyl-p-phenylenediamine, 6-ethyoxy-2,3,4-trimethyl-1,2-dihydroquinoline, semi-carbazide, phenothiazine, tetraphenylhydrazine, thio-dipropionic acid and thio-diglycolic acid.

\* \* \* \* \*